N. WILSON.
DEVICE FOR HARVESTING, BINDING, AND SHOCKING CORN.
APPLICATION FILED FEB. 15, 1908.
981,048.
Patented Jan. 10, 1911.
4 SHEETS—SHEET 2.
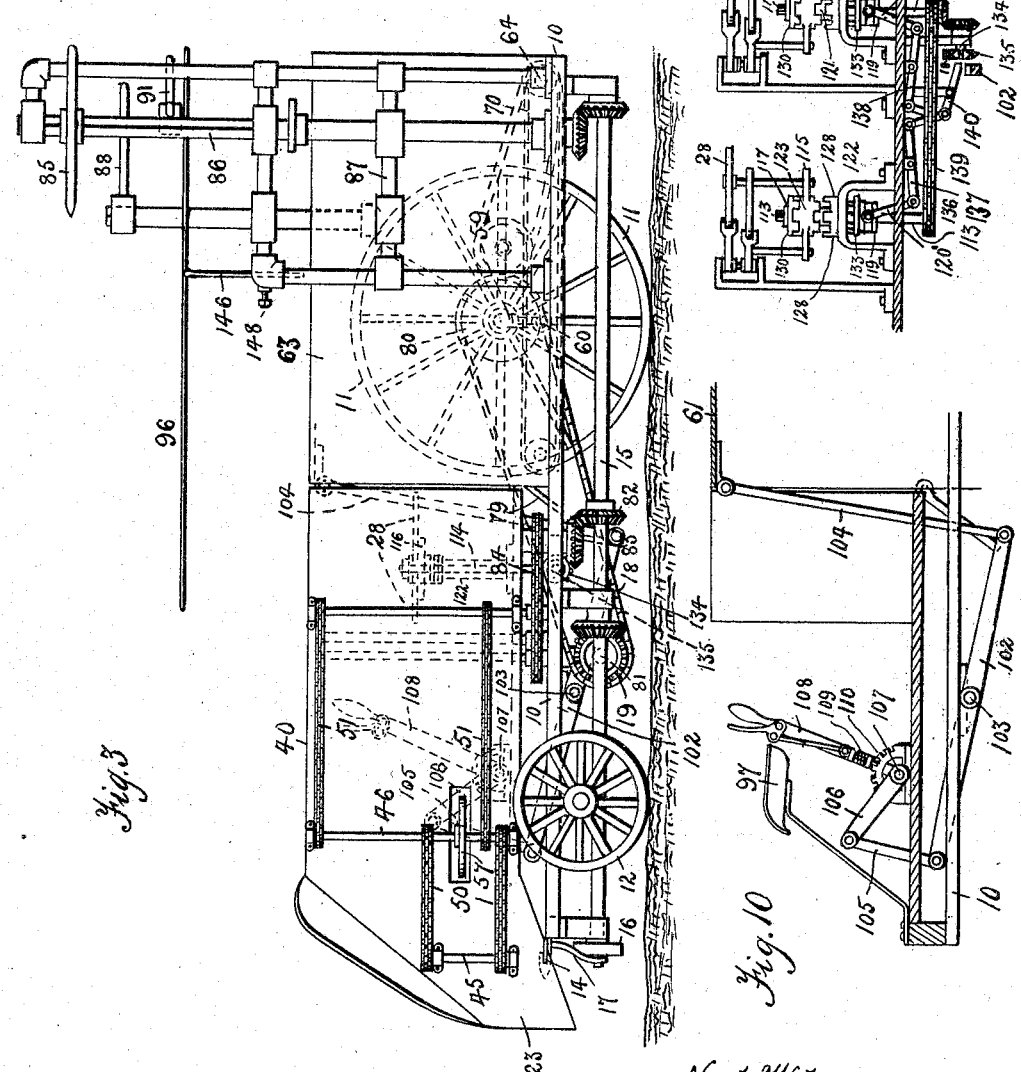
Witnesses
M. R. Meacham
C. N. Woodward
Noah Wilson,
Inventor
By Shoemaker & Brown
Attys.

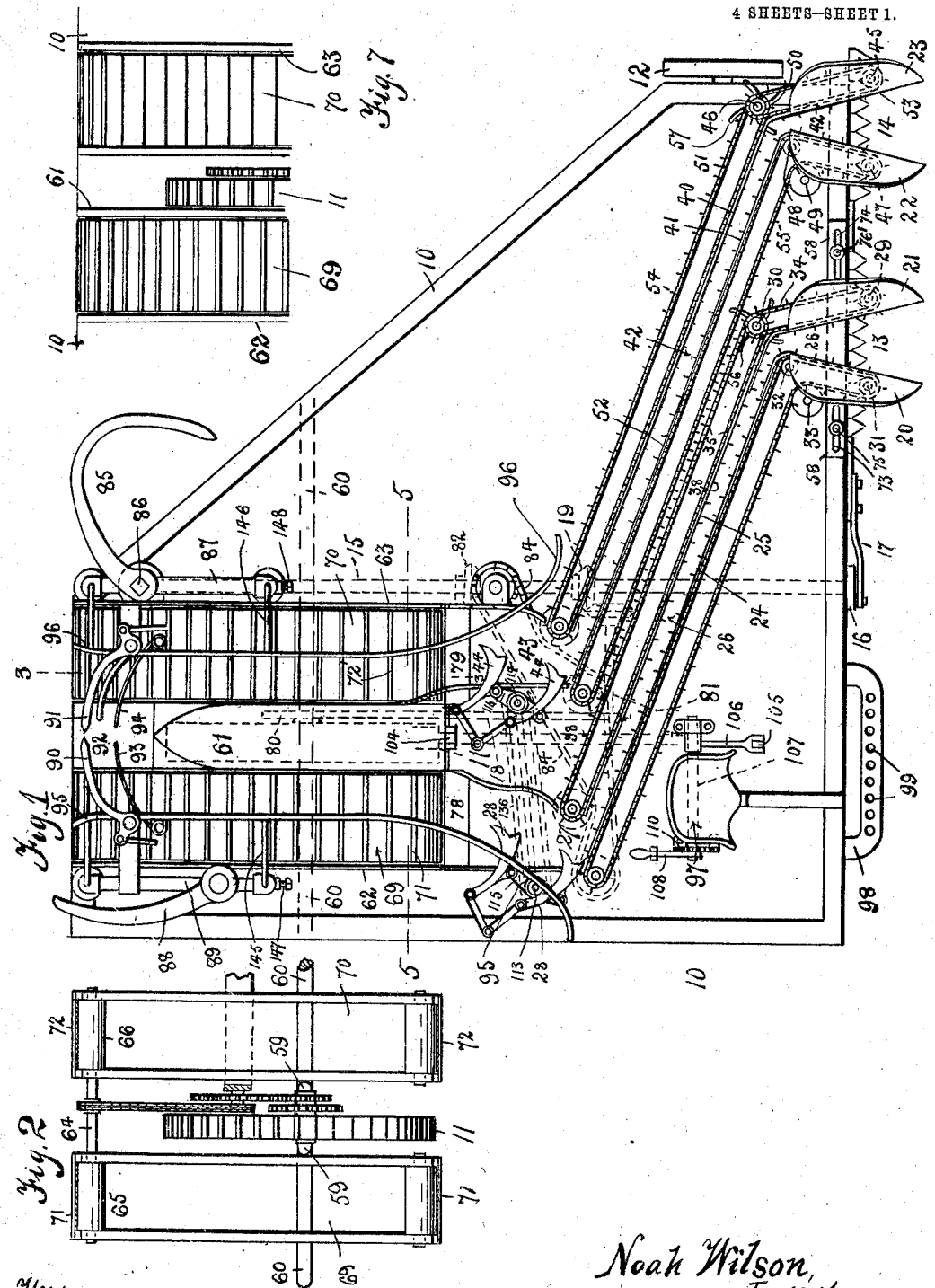
N. WILSON.
DEVICE FOR HARVESTING, BINDING, AND SHOCKING CORN.
APPLICATION FILED FEB. 15, 1908.
981,048.
Patented Jan. 10, 1911.
4 SHEETS—SHEET 1.
Witnesses.
M. R. Meacham
C. H. Woodward
Noah Wilson,
Inventor.
By Sholmak & Brown
Attys.

N. WILSON.
DEVICE FOR HARVESTING, BINDING, AND SHOCKING CORN.
APPLICATION FILED FEB. 15, 1908.
981,048.
Patented Jan. 10, 1911.
4 SHEETS—SHEET 3.
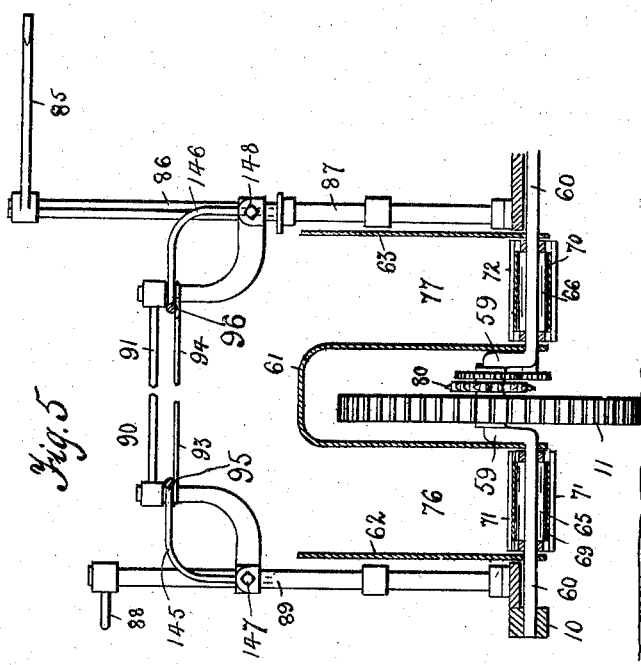
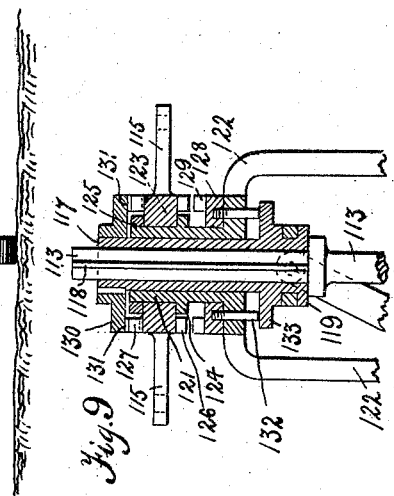
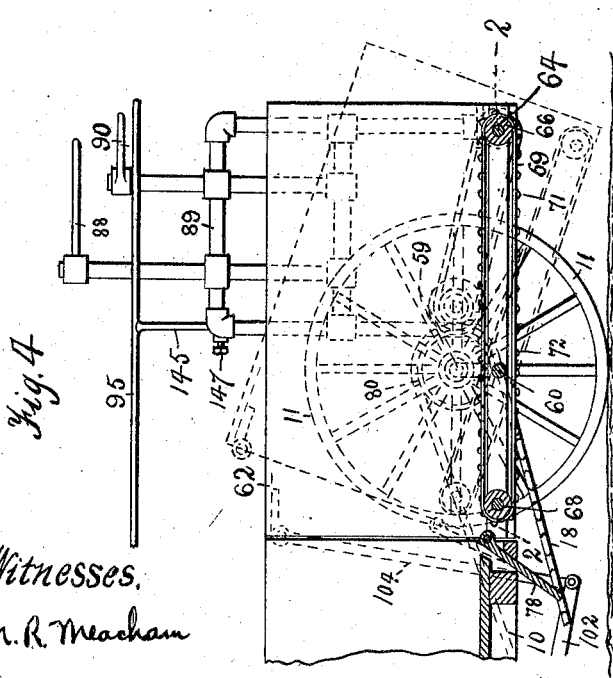
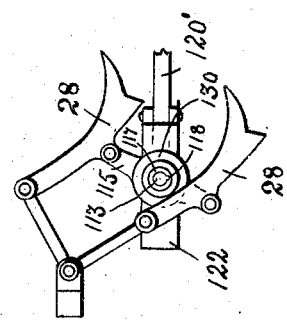
Witnesses.
M. R. Meacham
C. N. Woodward
Noah Wilson, Inventor.
By Shoemaker & Brown Attys.

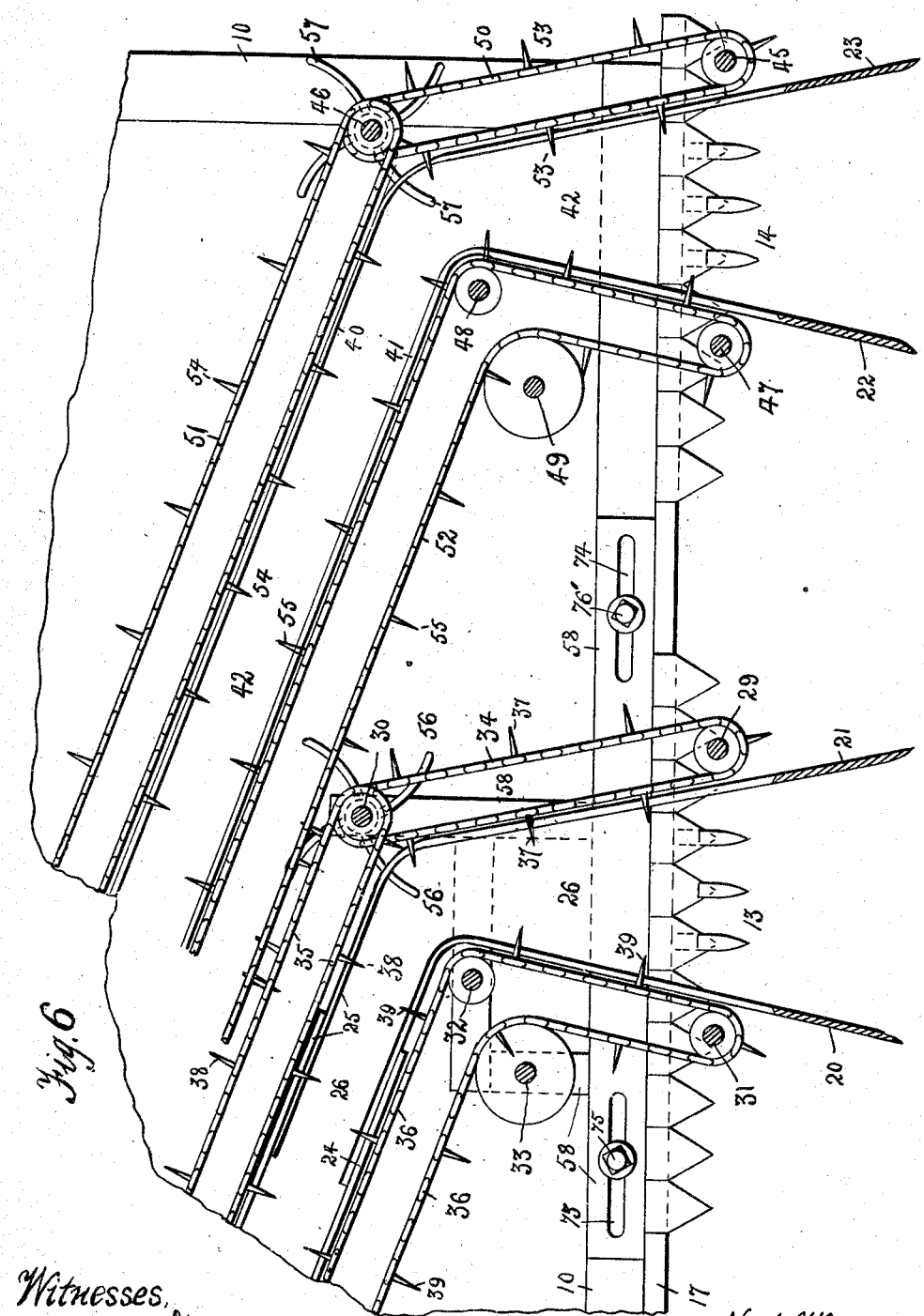

UNITED STATES PATENT OFFICE.

NOAH WILSON, OF PERU, INDIANA.

DEVICE FOR HARVESTING, BINDING, AND SHOCKING CORN.

981,048.  Specification of Letters Patent.  Patented Jan. 10, 1911.

Application filed February 15, 1908. Serial No. 416,069.

*To all whom it may concern:*

Be it known that I, NOAH WILSON, a citizen of the United States, residing at Peru, in the county of Miami and State of Indiana, have invented certain new and useful Improvements in Devices for Harvesting, Binding, and Shocking Corn, of which the following is a specification.

This invention relates to devices for harvesting and shocking corn, more particularly for harvesting fodder corn, and has for its object to provide a simply constructed device whereby two rows of the product may be harvested, and shocked simultaneously.

Another object of the invention is to provide novel mechanical means whereby the operations of cutting and shocking the corn are accomplished.

With these and other objects in view, the invention consists in the novel construction of apparatus herein shown and described and specifically pointed out in the claims, and in the drawings employed for illustrating the preferred embodiment of the invention, Figure 1 is a plan view of the improved apparatus complete. Fig. 2 is a detail plan view of the dumping portion of the shock receptacle with the carrier belts or bottom of the receptacle in section on the line 2—2 of Fig. 4. Fig. 3 is an elevation from the "grain" side. Fig. 4 is a section in the line 3—3 of Fig. 1. Fig. 5 is a transverse section on the line 5—5 of Fig. 1. Fig. 6 is an enlarged plan view partly in section of the harvesting portion of the apparatus. Fig. 7 is a detail view illustrating the arrangement and operation of the tripping mechanism of the retarders of the tilting shock discharge device. Fig. 8 is an enlarged plan view of one pair of the packer fingers between the receivers and the feeding devices. Fig. 9 is an enlarged sectional detail of the clutch mechanism of the packer fingers. Fig. 10 is a sectional detail of the mechanism for actuating the shock discharging device. Fig. 11 is a side elevation partly in section of the mechanism for controlling the packer fingers.

The improved apparatus comprises a bed frame 10 upon which the operating mechanism is mounted, the bed frame carrying the main ground wheel 11 which is utilized in the ordinary manner to actuate the moving parts of the apparatus, one of the ordinary bearing wheels being indicated at 12. The forward portion of the supporting frame will be extended to a sufficient extent to carry two separate harvesting or cutting devices sufficiently spaced apart to harvest two rows of corn, the rows being spaced generally between three and four feet apart. One of the cutting devices will be arranged for adjustment transversely of the head frame and likewise transversely of the line of travel of the machine, so as to adapt it to varying distances between the rows of corn.

The cutting or harvesting appliances comprise sickle devices, diverging gathering boards or plates, suitable feeding devices, such as endless chains having projecting fingers or teeth, independent guide ways also provided with endless feeding chains having projecting fingers or teeth, each guide way leading to a receiver into which the harvested corn is conducted and thence carried to the binder and there held until a sufficient quantity has accumulated to form a shock or bundle prior to being discharged from the machine.

Any suitable binding mechainsm may be employed, and as the binding mechanism is not necessarily a part of the present invention, portions of a conventional binder mechanism only are shown, a sufficient number of the parts being shown to illustrate the operation in co-action with the mechanism for feeding the material from the cutters or harvesting portion to the shock receptacle of the binder mechanism.

The sickles are represented at 13—14, preferably connected so as to be operative from a single shaft 15 through the medium of a crank wheel 16 and pitman 17, the shaft 15 being preferably operative through the medium of suitable chains 18 and gears 19 from the main ground or drive wheel 11. Arranged relative to the sickle 13 are converging gathering boards or plates 20—21, and arranged relative to the sickle 14 are similar gathering boards 22—23. The gathering boards 20—21 are attached to the adjustable frame 58 for a purpose hereinafter understood.

Leading rearwardly and thence laterally from the rear converging ends of the gathering boards 20—21 are spaced guide ways 24—25, preferably of sheet metal, and of sufficient height and at sufficient distances apart to enable the harvested corn to be conducted between them and maintained in vertical position, a suitable floor 26 being arranged at the bottom of the guide ways 24—25 and upon which the butt ends of the harvested corn bear when being conducted through the guide ways. At their discharge ends the guide ways 24—25 terminate in the portion 27 of the receiver through which the harvested corn is caused to pass by the action of suitable packer fingers 28, the latter to be actuated from the ground wheel 11, in any suitable manner or as hereafter described.

Arranged at suitable intervals adjacent to the gathering boards 20—21 and the sheet metal guide ways 24—25 are vertical shafts 29—30—31—32—33, the shafts carrying sprocket wheels over which endless chains 34—35—36 are arranged, the chains having fingers or teeth at intervals which project into the space between the gathering boards 20—21 and likewise into the space between the guide ways 24—25, so that the corn is conducted into the portion 27 of the receiver as fast as it is cut. The chain 34 is provided with teeth 37, the chain 35 is provided with teeth 38 and the chain 36 is provided with teeth 39, so that when motion is imparted to the various chains, the cut corn will be forcibly carried through the space between the various guide ways into the receiver, as before stated.

Leading rearwardly and thence laterally from the rear converging ends of the gathering boards 22—23 are spaced guide ways 40—41 similar to and extending parallel with the guide ways 24—25 and spaced therefrom, the guide ways 40—41 being also of sheet metal and of substantially the same height as the guide ways 24—25 to enable the material harvested between the gathering boards 22—23 to be conducted between the guide ways 40—41 in a vertical position, a suitable floor 42 being arranged at the bottom of the guideways 40—41 and upon which the butt ends of the harvested corn bear, in the same manner as in the guide ways leading from the gathering boards 20—21. At their discharge ends the guide ways 40—41 terminate in the portion 43 of the receiver which is similar to the portion 27 of the receiver, and through which the harvested corn is caused to pass by the action of suitable packer fingers 44 similar to the fingers 28 of the receiver portion 27.

Arranged at suitable intervals adjacent to the gathering boards 22—23 and the sheet metal guideways 40—41 are vertical shafts 45—46—47—48—49, these shafts carrying sprocket wheels over which endless chains 50—51—52 are arranged, the chains having fingers or teeth at intervals which project into the space between the gathering boards 22—23 and likewise into the space between the guide ways 40—41, so that the material is conducted into the receiver portion 43 as fast as it is cut. The chain 50 is provided with teeth 53, the chain 51 is provided with teeth 54, and the chain 52 is provided with teeth 55, so that when motion is imparted to the various chains, the cut material will be forcibly carried into the receiver portion 43 in the same manner as the material is carried into the receiver portion 27, as before described.

The two sets of guide ways 24—25 and 40—41 are arranged obliquely between the two sets of gathering boards and the receiver, and in parallel relation.

At the points where the passage ways between the gathering boards and the receiver turn at angles it may be necessary to provide the shafts 30 and 46, respectively, with lateral fingers or arms 56—57, to operate at these points within the spaces between the guide ways, and thus obviate any tendency of the cut material to become clogged.

The shafts 29—30—31—32—33 are mounted upon a separate framework 58 and provided with means, such as slots 73—74 and clamp bolts 75—76' for adjustment transverse to the line of draft and parallel to the cutting mechanism operating in connection with the gathering boards 22—23 so that the gathering mechanism associated with the gathering boards 20—21 may be adjusted to correspond to the varying widths of the spaces between the rows of plants, the chains 36—36 being correspondingly shortened or lengthened by removing or inserting a sufficient number of links thereof in the usual manner.

The guide members 24—25 are overlapped by the inner ends of the gathering boards 20—21, so that gaps will not occur between the parts when the gathering boards 20—21 are adjusted toward and away from the gathering boards 22—23.

The axle of the ground wheel 11 is arched, as shown at 59, to carry the wheel 11, and thence extends in opposite directions as at 60 and connected to the frame 10. Swinging upon the projecting portion 60 of the axle is a hood 61 and extending over the ground wheel, and swinging upon the axle portion 60 are guard plates 62—63 spaced from the vertical sides of the hood, as shown. Journaled through the hood and guard plates at one end is a shaft 64 carrying drums 65—66, and journaled in the other end of the hood and in the guard plates are drums 67—68, with endless belts 69—70 carried by the drums and provided with spaced transverse slats 71—72. The spaces between the guard plates 62—63 and the hood form guide ways or portions of the receiver 76—77, see Fig. 5, having the endless slatted belts at their bottoms, the endless slatted belts, hood and guard plates being thus arranged to rock upon the axle members 60, so that the rear end of the rocking device may be lowered and the forward end elevated, as shown by dotted lines in Fig. 4, to enable the "shock" of material after being bound by any suitable binding mechanism to be more readily discharged. The forward ends of the hood 61 and of the guard plates 62—63 are provided with swinging stop members 78—79 to form closures to the forward ends of the guide ways 76—77 when the forward end is elevated into the position shown in the dotted lines, and thus form stops to prevent the material passing from the receiver portions 27—43 when the rocking device is in discharging position, as hereafter explained.

As before stated, motion will be imparted to the various shafts and to the sickle device from the main drive wheel 11, and preferably as shown in the drawings. The operating means shown comprises a sprocket wheel 80 upon the axle from which the chain 18 is conducted to a sprocket wheel on a counter shaft 81 and thence through gears 19 through a main shaft 15, the sickle mechanism being operatively connected to the shaft 15, as before described. The various toothed chains 34—35—36—50—51—52 are likewise adapted to be operated from the shaft 15 through the medium of gears 82—83 and a chain 84, the latter running over sprocket wheels on the shafts associated with the chains at their receiver ends, as indicated by dotted lines in Fig. 1.

The means shown for actuating and controlling the movement of the tilting shock discharging device may be of any desired construction, but the one shown comprises a lever 102 pivoted intermediate the ends at 103 to the frame 10 and connected at one end by a rod 104 to the hood 61 and connected at the other end by a link 105 to an arm 106 attached to a rock shaft 107 mounted for oscillation upon the frame 10. Attached to the rock shaft 107 is a lever 108 extending to a point convenient to the driver's seat 97 and provided with a spring pawl 109 engaging a toothed segment 110. By this means the tilting device is under the control of the driver. As the lever 108 is convenient for manipulation by the driver without him leaving his seat, the tilting device may be operated conveniently and at the proper time.

While I have shown an operative means for transmitting the motion from the wheel 11 to the various moving parts of the device, it will be understood that I do not desire to be limited thereto, as various modifications may be made in the device without departing from the principle of the invention.

Any desired form of binder mechanism may be employed in connection with the device, but for the purpose of illustration, I have shown a conventional needle arm at 85 mounted for vertical adjustment upon a shaft 86, the latter suported in a suitable frame work 87 rising from the frame 10, while a conventional form of discharge arm 88 is shown connected to a supporting frame 89 also rising from the frame 10. There is also shown two arms 90—91 operating to hold the shock in position to be bound and with a conventional trip arm 92 and retarding fingers 93—94 operating in conjunction with the binder mechanism in substantially the same manner as such devices are employed in connection with ordinary grain binders and similar structures. Guard rods 95—96 are also arranged above the endless slatted belts and adapted to be engaged by the upper portions of the material as it is conducted through the receivers 27—43 and thence into the guide-ways 76—77 of the tilting shock receptacle and retained in a vertical position while being conducted to the binder mechanism, the rods being adjustable vertically.

A draft clevis is arranged at 98 and provided with a plurality of spaced apertures 99, to enable the tongue or draft evener to be adjusted relative to the frame 10 to equalize the line of draft and avoid side draft.

By this arrangement, it will be obvious that two rows of corn or other material may be harvested, bound and shocked simultaneously, thus materially expediting the operation and reducing the time and labor necessary to harvest the crop.

The packer members 28—44 are of the usual form employed in grain binders, and will operate in the same manner, and will also perform the two-fold function of packer fingers to force the material from the chain conveyer devices into the guideways 76—77 and will be provided with automatic means whereby the packer fingers will be rigidly held stationary and projecting across the receiver portions 27—43 to a sufficient extent to hold the material back while the tilting device is in its discharging position and thus preventing the feeding action during the time the tilting device is in its discharging position. As before stated any type of means may be employed for producing the two-fold action of the packer fingers but there is illustrated in Figs. 1, 9 and 11 one form of means for this purpose which consists of vertical shafts indicated respectively at 113—114 carrying the arms 115—116 of the usual form and coupled by their ends respectively to the packer fingers 28—44. The shafts 113—114 are each provided with a double acting clutch mechanism operating to alternately couple and uncouple the packer fingers to the shaft, and as these clutch mechanisms are precisely alike, one only is shown in detail in Fig. 9 for illustration, and this clutch mechanism is constructed as follows.

Surrounding the shaft 113 is a sleeve 117 slidable upon the shaft for a short distance and adapted to be rotated therewith, as by a feather 118 operating in a corresponding channel within the sleeve. By this means it will be obvious that the sleeve partakes of the rotary motion of the shaft, while at the same time it is slidable thereon, and the means employed for producing the sliding motion consists of a grooved collar 119 in which a shipper lever 120' is connected in the ordinary manner. The sleeve 117 is supported for rotation in a stationary bearing member 121 connected to or formed integral with a suitable standard 122, the latter connected in any suitable manner to the floor of the frame 10. The hub 123 of the arms 115 is mounted for rotation upon this bearing member 121, being supported thereon by a suitable flange 124 and a removable collar 125. The lower face of the hub member 123 is provided with clutch teeth 126 while the upper face of the hub member is provided with clutch teeth 127. Slidably disposed upon the bearing 121 between the hub 123 and the standard 122 is a movable clutch member 128 having teeth 129 adapted to engage with the teeth 126, while another clutch member 130 is connected to the upper end of the sleeve 117 and provided with depending clutch teeth 131 adapted to engage the teeth 127. Depending from the clutch member 128 are pins 132 extending through the standard 122 and adapted to be engaged by a flange 133 upon the sleeve 117. The pins thus serve the twofold function of means for operating the member 128 and to hold the member 128 from rotation upon the standard 122. The parts will be so arranged that when the sleeve 117 is in its lower position, as shown in Fig. 9, the clutch member 130 will engage the clutch teeth 127 by its teeth 131 and thus couple the hub 123 with the shaft 113, so that the hub and its arms 115 are rotated by the shaft. Then when the shipper lever 120' is operated the constantly rotating sleeve 117 will be elevated causing the flange 133 to move the pins 132 with it and thus elevate the clutch member 128 and cause the teeth 129 to engage the teeth 126, while at the same time the elevation of the sleeve 117 will also elevate the member 130 and disconnect the teeth 131 from the teeth 127, thereby coupling the hub 123 with the non-rotative member 128, and hold the hub 123, its arms 115, and the packer fingers 28 rigidly in position, and as one of the packer fingers always projects across the receiver portion 27, the material being fed in by the conductor chains 35—36 will be held back and prevented from being fed upon the belt 69. In this connection it will be obvious that, as before stated, the guard 78 co-acts with the stationary packer fingers to hold the cut material back during the discharging operation of the tilting device.

The shaft 114 extends below the floor of the frame 10 and is provided with a bevel gear co-acting with a similar bevel gear on a short counter shaft 134, and the counter shaft is provided with a small sprocket wheel 135 in position to be engaged by the chain 18, whereby the motion of the chain will be communicated to the shaft 114. The shafts 113 and 114 are provided with chain pulleys over which an endless chain, indicated at 136, is arranged, so that the motion of the shaft 114 will be communicated to the shaft 113.

The shipper levers by which the double acting clutch devices are operated extend downwardly, as shown in Fig. 11, and connected to levers 137—138, the later connected to another lever 140, the latter extending into the path of the lever 102, so that when the lever 108 is operated to actuate the shock discharging devices, as above described, the elevation of the rear end of the lever 102 will cause the latter to engage the lever 140 and thus through the levers 137—138 actuate the shipper levers of the clutch devices and automatically disconnect both sets of packer fingers and dispose them in stationary position automatically with the operation of the tilting discharge devices.

While I have shown an operative mechanism for accomplishing the various movements, it will be understood that I do not wish to be limited necessarily to the precise mechanism disclosed, as various changes within the scope of the appended claims may be made without departing from the principle of the invention or sacrificing any of the advantages.

The guide rods 95—96 are provided with standard 145—146 directed downwardly into one of the vertical members of the frame 87—89, and adjustable therein by means of set screws 147—148 so that the guide rods 95—96 may be adjusted vertically to correspond to the lengths of material passing into the receiver portions 76—77, the rods 95—96 operating upon the material to converge it toward the center and in position to be engaged by the binding mechanism.

The material after being severed by the cutting appliances is conducted into the receiver which is divided by the hood into two parts with the upper portion of the receiver united above the hood and the material compressed above the hood by the rods 95—96 to enable the binder mechanism to engage the material. As the material is fed into the receiver by the action of the packers 28— and 44, the endless belts 69—70 acting against the butt ends of the material assist in carrying it forward and retain it in a vertical position. When a sufficient quantity has accumulated to produce a shock, the tilting action of the receiver above described takes place, and the guard 78—79 is elevated to prevent the material from passing over the belts during the discharging operations, the material being held back by the stopping of the motion of the packers 28—44, as hereinbefore described. The endless belts 69—70 are continuous in their operation, but owing to their relatively slight friction and pressure upon the material, they do not interfere with the binding and discharging operations, and perform substantially the same function as "butting devices" of grain binders.

Having thus described the invention what I claim as new and desire to secure by Letters Patent is:—

1. In an apparatus of the class described, the combination of a main frame, cutting devices arranged to operate on two rows of plants, a tilting shock receptacle, feeding means between said cutting devices and the receptacle, means at the discharge end of said receptacle for holding the material therein, means for simultaneously tilting said receptacle and releasing said holding means, and means for holding the material back from the receptacle during the tilting action.

2. In an apparatus of the class described, the combination of a main frame, cutting devices carried by said frame, a tilting shock receptacle, feeding means between said cutting devices and receptacle, other feeding devices between said first mentioned feeding means and receptacle, means at the discharge end of the receptacle for holding the material therein, means for simultaneously actuating said tilting receptacle and releasing said holding means, and means for holding said other feeding devices stationary during the tilting action.

3. In an apparatus of the class described, a frame, a gathering device, a cutting device, a receiver, means for conducting the material to the receiver, a tilting shock receptacle including a bottom formed of an endless belt to carry the material to the rear of the receptacle, means to conduct the material from the receiver to the receptacle, and means constructed and arranged to obstruct the passage between the receiver and receptacle when the latter is tilted.

4. In an apparatus of the class described, a frame, a gathering device, a cutting device, a receiver, means for conducting the material to the receiver, a tilting shock receptacle including a bottom formed of an endless belt to carry the material to the rear of the receptacle, means to conduct the material from the receiver to the receptacle, and swinging means arranged for operation upon tilting the receptacle to obstruct the passage between the receiver and receptacle to stop feed of the material to the latter.

5. In an apparatus of the class described, a frame, a gathering device, a receiver, means for conducting the material from the gathering device to the receiver, a tilting shock receptacle provided with a movable bottom, means to conduct the material from the receiver to the receptacle, the receptacle having a central hood which forms a partition and which divides the receptacle centrally, and swinging means operable upon tilting movement of the receptacle to obstruct the passage between the receiver and receptacle to stop the feed of the material to the receptacle when the latter is tilted.

6. In an apparatus of the class described, a supporting frame, a driving ground wheel carried by said supporting frame, a shock receptacle including a guard hood extending over said ground wheel, a receiver at each side and in front of said hood, two cutting devices carried by said supporting frame and arranged for operation simultaneously upon two rows of plants, means for conducting the cut material respectively from said cutting devices to said receivers, means for feeding said material from said receivers to said shock receptacle, and means for transmitting motion from the ground wheel to said conducting and feeding mechanism.

7. In an apparatus of the class described, a supporting frame, a driving ground wheel carried by said supporting frame, a shock receptacle having a movable bottom and also including a hood disposed over the ground wheel, a receiver at each side and in front of said hood, two cutting devices carried by the frame and arranged to operate upon two rows of plants, means for conducting the cut material from the cutting devices to said receivers, means for feeding the material from the receivers to said receptacle, and means for transmitting the motion of the ground wheel to the conducting and feeding mechanisms and to the movable bottom of the shock receptacle.

8. In an apparatus of the class described, a frame, two gathering devices disposed at one side of said frame, a carrier wheel supporting said frame near the other side thereof, a cutter device for each of said gathering devices, a shock receptacle, receivers for the material disposed in advance of said receptacle, conducting means between said gathering devices and receivers, and feeding means between the receivers and the shock receptacle, said shock receptacle having its bottom formed of endless carrier belts disposed at opposite sides of said wheel and operating to conduct the material toward the rear of the shock receptacle.

9. In an apparatus of the class described, a supporting frame, an axle connected to said frame, a carrier wheel mounted for rotation upon said axle, a hood extending over said wheel and swinging upon the axle, guard plates spaced from the hood and swinging upon the axle, endless carrier belts disposed between said guard plates and hood and swinging therewith, gathering devices carried by said frame, a cutter device for each of said gathering devices, receivers disposed in advance of said carrier belts, conducting means between said receivers and gathering devices, means to conduct the material from the receivers to said endless belts, means for transmitting the motion of said wheel to said cutters, and means for transmitting the motion of the wheel to both of said conducting means.

10. In an apparatus of the class described, a supporting frame, a carrier wheel mounted for rotation upon said frame, two gathering devices carried by said frame, a shock receptacle including carrier belts operating at opposite sides of said wheel and also including a central hood forming a partition to guide the material past said wheel, receivers disposed forwardly of said wheel, conducting means between said gathering devices and receivers, feeding devices between said receivers and said belts, and guard rods disposed above said belts for directing the material to said shock receptacle.

11. In an apparatus of the class described, a supporting frame, an axle connected to the frame, a carrier wheel mounted for rotation upon the axle, a hood extending over said wheel and swinging upon said axle, guard plates spaced from said hood and swinging from said axle, endless carrier belts disposed between said guard plates and hood and swinging therewith, gathering devices carried by the frame, a cutting device for each of said gathering devices, means for conducting the material from the gathering devices, means for swinging the hood and guard plates, and swinging guard plates at the forward ends of said hood and the aforesaid guard plates for operation when the first mentioned guard plates are swung upon the axle to arrest the feeding of material to the spaces between the hood and first mentioned guard plates.

12. In an apparatus of the class described, a supporting frame, an axle connected to said frame, a carrier wheel mounted for rotation on said axle, a tilting receptacle including guard plates and a bottom composed of endless carrier belts, the receptacle also including a central hood forming a partition and being mounted to swing upon said axle and the belts being disposed between the guard plates and hood and swinging therewith, gathering devices carried by said frame, a cutter for each of said gathering devices, receivers disposed in advance of said receptacle, conducting means between the receivers and gathering devices, other guard plates between said belts of the receptacle and the receiver whereby stops are formed between the receiver and belts when the receptacle is tilted to discharge the material.

In testimony whereof I affix my signature, in presence of two witnesses.

NOAH WILSON.

Witnesses:
J. E. MADDOCK,
M. A. WILSON.